(12) United States Patent
Tanaka

(10) Patent No.: US 8,902,898 B2
(45) Date of Patent: Dec. 2, 2014

(54) APPARATUS AND METHOD FOR TRANSFERRING A DATA SIGNAL BY BYPASSING A POWER-SAVING SEGMENT IN A COMMUNICATION NETWORK

(71) Applicant: Fujitsu Limited, Kawasaki (JP)

(72) Inventor: Masaru Tanaka, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 76 days.

(21) Appl. No.: 13/741,756

(22) Filed: Jan. 15, 2013

(65) Prior Publication Data

US 2013/0242977 A1 Sep. 19, 2013

(30) Foreign Application Priority Data

Mar. 19, 2012 (JP) ................................ 2012-062653

(51) Int. Cl.
*H04L 12/28* (2006.01)
*H04L 12/12* (2006.01)
*H04L 12/717* (2013.01)
*H04L 12/24* (2006.01)

(52) U.S. Cl.
CPC ............. *H04L 12/28* (2013.01); *H04L 41/0833* (2013.01); *H04L 12/12* (2013.01); *Y02B 60/34* (2013.01); *H04L 45/42* (2013.01); *H04L 41/0659* (2013.01)
USPC ........ 370/392; 370/236; 370/255; 370/395.2; 370/410

(58) Field of Classification Search
USPC ............... 370/236, 255, 389, 392, 395.2, 410
See application file for complete search history.

(56) References Cited

U.S. PATENT DOCUMENTS

| | | | | |
|---|---|---|---|---|
| 7,046,619 | B2 * | 5/2006 | Alagar et al. ................. | 370/216 |
| 2003/0020982 | A1 * | 1/2003 | Rychlicki ..................... | 359/124 |
| 2010/0146151 | A1 * | 6/2010 | Jeong et al. ................... | 709/242 |
| 2012/0163797 | A1 * | 6/2012 | Wang ............................... | 398/2 |
| 2013/0077478 | A1 * | 3/2013 | Matsuura ...................... | 370/225 |
| 2013/0201891 | A1 * | 8/2013 | Rodriguez et al. ............ | 370/311 |
| 2013/0242977 | A1 * | 9/2013 | Tanaka .......................... | 370/351 |

FOREIGN PATENT DOCUMENTS

| | | | | |
|---|---|---|---|---|
| JP | 2009-100442 | | 5/2009 | |
| JP | 2010-239299 | | 10/2010 | |
| JP | 2010-268342 | | 11/2010 | |
| WO | WO2012025785 | A1 * | 3/2012 | ........... H04W 40/005 |

* cited by examiner

*Primary Examiner* — Benjamin H Elliott, IV
(74) *Attorney, Agent, or Firm* — Staas & Halsey LLP

(57) ABSTRACT

An apparatus transfers a data signal along a transmission route that is set by a route determination device. The apparatus includes a data transmission unit and a controller. The data transmission unit receives the data signal from an upstream node adjacent to the apparatus in an upstream direction of the data signal along the transmission route, and transfers the data signal to a downstream node adjacent to the apparatus in a downstream direction of the data signal along the transmission route. The controller controls power supply to the data transmission unit, and transmits a route-reconfiguration instruction for reconfiguring the transmission route, to the route determination device, upon receiving, when power supply to the data transmission unit is stopped, from the route determination device, a path-creation request for requesting creation of a path on the transmission route.

9 Claims, 7 Drawing Sheets

FIG. 6

| No. | TARGETED PART (Shelf-Slot-Port) | REQUESTOR DEVICE ID | STATE |
|---|---|---|---|
| 1 | 1-1-1 | DEVICE #A | WAITING-FOR-DETERMINATION |
| 2 | 1-4-1 | — | POWER SAVING |

US 8,902,898 B2

APPARATUS AND METHOD FOR TRANSFERRING A DATA SIGNAL BY BYPASSING A POWER-SAVING SEGMENT IN A COMMUNICATION NETWORK

CROSS-REFERENCE TO RELATED APPLICATION

This application is based upon and claims the benefit of priority of the prior Japanese Patent Application No. 2012-062653 filed on Mar. 19, 2012, the entire contents of which are incorporated herein by reference.

FIELD

The embodiments discussed herein are related to an apparatus and a method for transferring a data signal by bypassing a power-saving segment in a communication network.

BACKGROUND

In recent years, with the increasing size of networks, the power consumption of network devices in telecommunication carriers has been increasing year by year. With the goal of reducing this power consumption, the following study has been conducted. In this study, the resources of an entire network are reallocated, thereby intentionally creating an unused route. Then, the power consumption of network devices may be reduced by turning off the power of the network device on the unused route. A target technology of this study has been under development for practical use. Note that a segment on a route in which a network device is in an off state will be hereinafter also referred to as a "power-saving segment."

Moreover, with the expansion of networks, the complexity of path management has increased. As a method for reducing the complexity, a technology related to automatic path route selection and path generation using various network topologies is used. Examples of the various network topologies include generalized multi-protocol label switching (GM-PLS), open shortest path first (OSPF), and open systems interconnection (OSI).

The power-saving segment is recognized as a normal state in a network topology.

FIG. 1A is a diagram illustrating an example of a connection state of an actual network, and FIG. 1B is a diagram illustrating an example of a connection state of a network in a network topology. As illustrated in FIG. 1A, for example, powers of respective interface (IF) boards of a network device #C and a network device #D are in an off state, and the network device #C and the network device #D are actually disconnected. However, even in this state, as illustrated in FIG. 1B, on the network topology, it is recognized that the network device #C and the network device #D are connected. Therefore, the power-saving segment is also a target route which may be selected by a route determination device. However, if the power-saving segment is selected as a transmission route, power of a network device in the power-saving segment is turned on, and therefore, power saving may not be achieved.

There has been proposed a technology for minimizing the probability of selection of a power-saving segment as a transmission route. In this technology, the concept of cost is introduced and a cost value is added to routes between network devices in a network topology. For the power-saving segment, a high cost value is set. Thus, a route with low cost is preferentially selected, and accordingly, the probability of selection of the power-saving segment as a transmission route may be decreased.

Note that a network includes, in addition to a plurality of network devices (nodes), a monitoring control device that monitors a state of the network.

FIGS. 2A and 2B are diagrams each illustrating a method for monitoring a network by a monitoring control device. A first example of the method for monitoring a network by the monitoring control device is "inband signaling" in which the monitoring control device is connected to one of a plurality of network devices via a local connection network (LCN), as a control link, and is connected to the other devices of the plurality of network devices via the one of the plurality of network devices (see FIG. 2A). A second example of the method for monitoring a network by the monitoring control device is "outband signaling" in which the monitoring control device is connected to each of the plurality of network devices via an LCN in one-to-one correspondence, as a control link (see FIG. 2B). In the examples, the LCN is, for example, a local area network (LAN). The above-described route determination device may be the monitoring control device, or the network device to which the monitoring control device is connected.

Japanese Laid-open Patent Publication No. 2009-100442 is an example of the related art.

SUMMARY

According to an aspect of the invention, an apparatus transfers a data signal by bypassing a power-saving transmission route. The apparatus includes a data transmission unit and a controller. The data transmission unit receives the data signal from an upstream node adjacent to the apparatus in an upstream direction of the data signal along a transmission route that is set by a route determination device. Then, the data transmission unit transfers the data signal to a downstream node adjacent to the apparatus in a downstream direction of the data signal along the transmission route. Meanwhile, the controller controls power supply to the data transmission unit. Upon receiving, when power supply to the data transmission unit is stopped, from the route determination device, a path-creation request for creating a path on the transmission route, the controller transmits a route-reconfiguration instruction for reconfiguring the transmission route, to the route determination device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a management table, according to an embodiment;

DESCRIPTION OF EMBODIMENTS

Figure 1A:
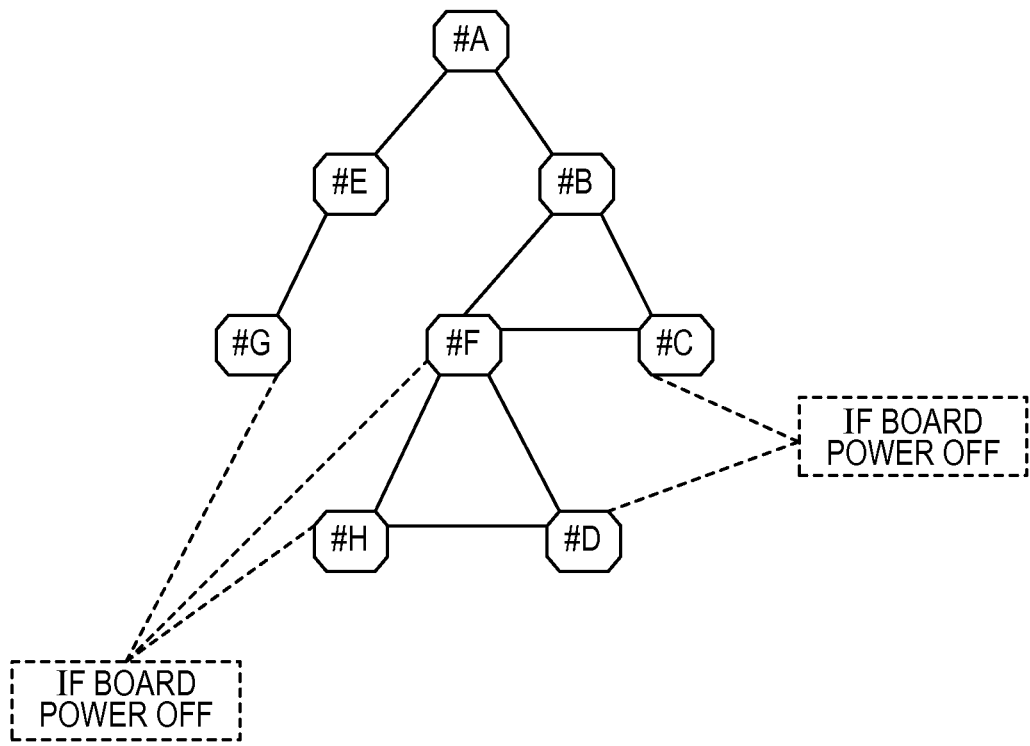
FIG. 1A is a diagram illustrating an example of a connection state of an actual network.
Figure 1B:
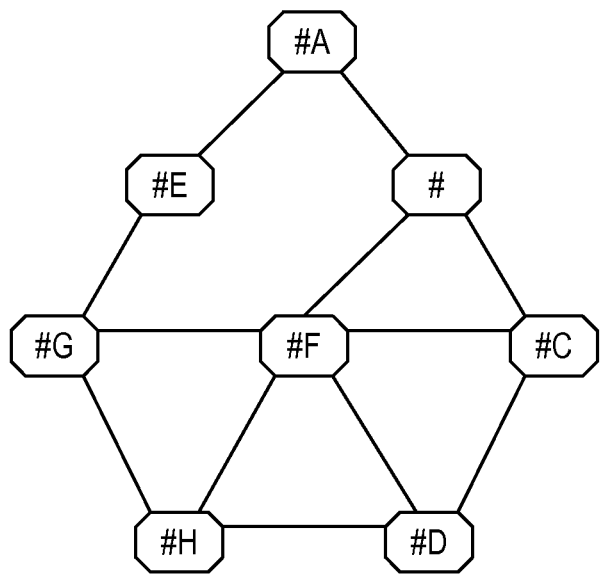
FIG. 1B is a diagram illustrating an example of a connection state of a network in a network topology.
Figure 2A:
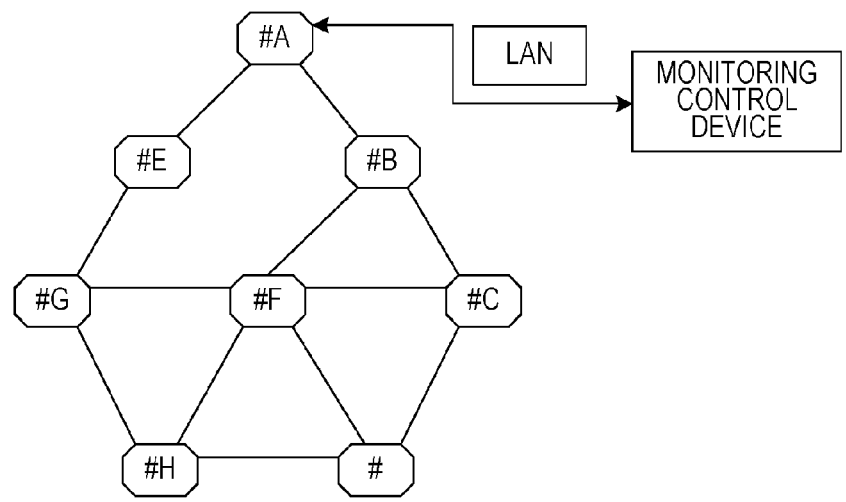
FIGS. 2A and 2B are diagrams each illustrating a method for monitoring a network by a monitoring control device.
Figure 2B:
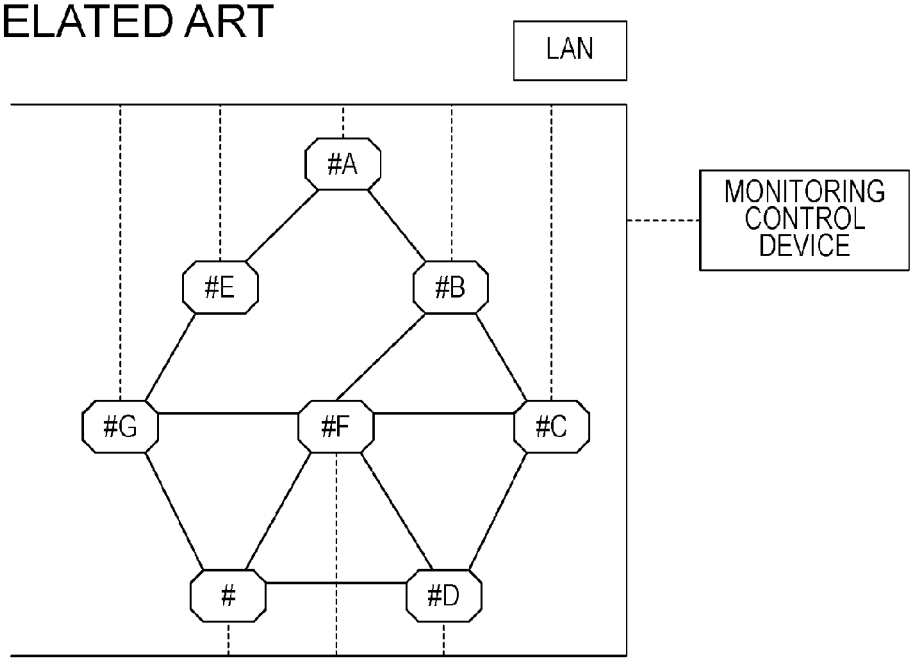

In a large network, the number of network devices included in a transmission route may largely vary between different routes. Therefore, according to the related art, there may be cases where the cost of a route which does not include the power-saving segment is higher than that of a route including the power-saving segment, and as a result, the route including the power-saving segment may be selected. Moreover, according to the related art, since once the power-saving segment is selected as a transmission route, the selection is not rejectable, the power of the network devices in the power-saving segment is turned on. Thus, a power saving state may not be continued.

Hereinafter, embodiments of a network device, a network control method, and a computer readable recording medium having stored therein a program according to the present disclosure will be described in detail with reference to the accompanying drawings. Note that the following embodiments in no way limit a network device, a network control method, and a computer readable recording medium having stored therein a program according to the present disclosure. Also, in the following embodiments, components having the same function are denoted by the same reference character, and description thereof is not repeated.

First Embodiment

Configuration of Network Device

Figure 3:
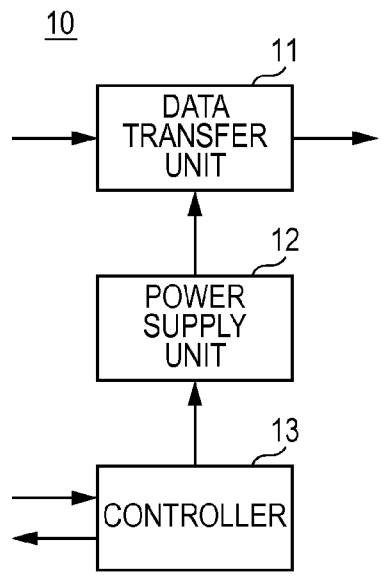
FIG. 3 is a diagram illustrating a configuration example of a network device, according to a first embodiment.

FIG. 3 is a diagram illustrating a configuration example of a network device, according to a first embodiment. A network device 10 belongs to a network in which a data signal is transferred via a plurality of devices along a transmission route that is set by a route determination device. In FIG. 3, the network device 10 may be configured to include a data transfer unit 11, a power supply unit 12, and a controller 13. Hereinafter, a network device will also referred to as "a node", for convenience of explanation.

The data transfer unit 11 is operated by power supplied from the power supply unit 12. In an active state, the data transfer unit 11 receives a data signal from a network device adjacently located in an upstream direction of the data signal along the transmission route set by the route determination device, and transfers the data signal to a network device adjacently located in a downstream direction of the data signal along the transmission route. The transfer of the data signal is performed via a data link that is set along the transmission route.

The power supply unit 12 starts or stops power supply to the data transfer unit 11, based on a control signal received from the controller 13.

The controller 13 outputs, to the power supply unit 12, a control signal for instructing the power supply unit 12 to start or stop power supply. Thus, the controller 13 causes the power supply unit 12 to start or stop power supply to the transfer unit 11.

In a state where power supply to the data transfer unit 11 is stopped, when the controller 13 receives a path creation request transmitted from the route determination device, the controller 13 transmits, to the route determination device, a "route-reconfiguration instruction" signal for instructing the route determination device to reconfigure the transmission route. The route-reconfiguration instruction is transmitted via a control link that is used for transmission of a control signal between a network device and the route determination device. The route-reconfiguration instruction is, for example, a signal that indicates a failure occurrence between the network device 10 and a network device adjacently located in a downstream direction of the data signal along the transmission route. Note that the controller 13 transmits, to the route determination device, a "normal completion response" in response to the path creation request, via the control link, before or at the time of transmitting the route-reconfiguration instruction.

The controller 13 starts a timer at a timing when the controller 13 transmits the route-reconfiguration instruction. When the controller 13 receives a "cancel signal" for canceling the path requested by the path creation request, before a predetermined time has elapsed since the time when the controller 13 transmitted the route-reconfiguration instruction, the controller 13 transmits a signal indicating recovery from the failure to the route determination device.

On the other hand, when the controller 13 does not receive the cancel signal before a predetermined time has elapsed since the controller 13 transmitted the route-reconfiguration instruction, the controller 13 starts power supply of power supply unit 12 to the data transfer unit 11, transmits a signal indicating recovery from the failure to the route determination device, and creates a path requested by the path creation request.

Operation of Network Device

Operations of the network device 10 having the above-described configuration will be described.

Figure 4:
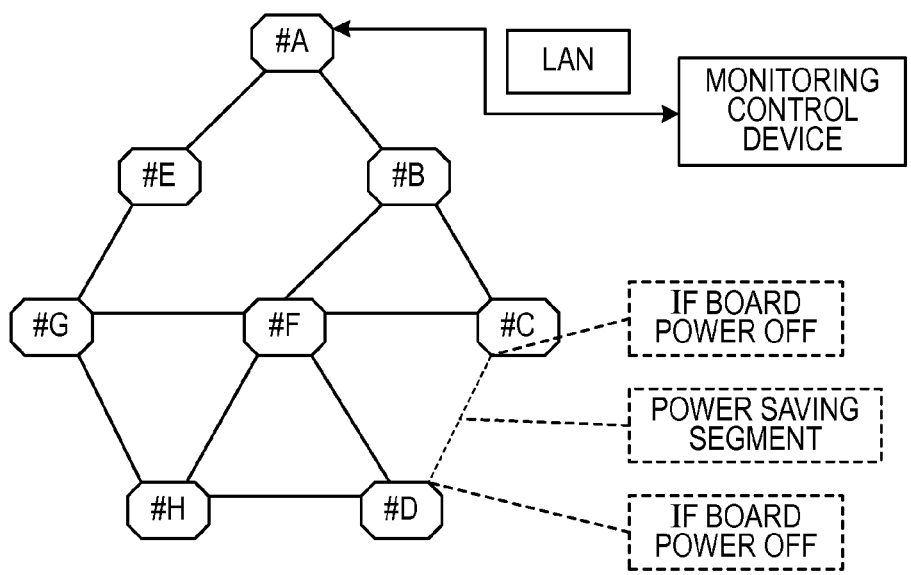
FIG. 4 is a diagram illustrating an example of a network including a power-saving segment.

FIG. 4 is a diagram illustrating an example of a network including a power-saving segment.

In the state of the network illustrated in FIG. 4, power supply to respective interface boards of network devices #C and #D is stopped, and a segment between the network device #C and the network device #D is the power-saving segment. The network device 10 corresponds to a network device in a power saving mode, that is, for example, the network device #C.

Figure 5:
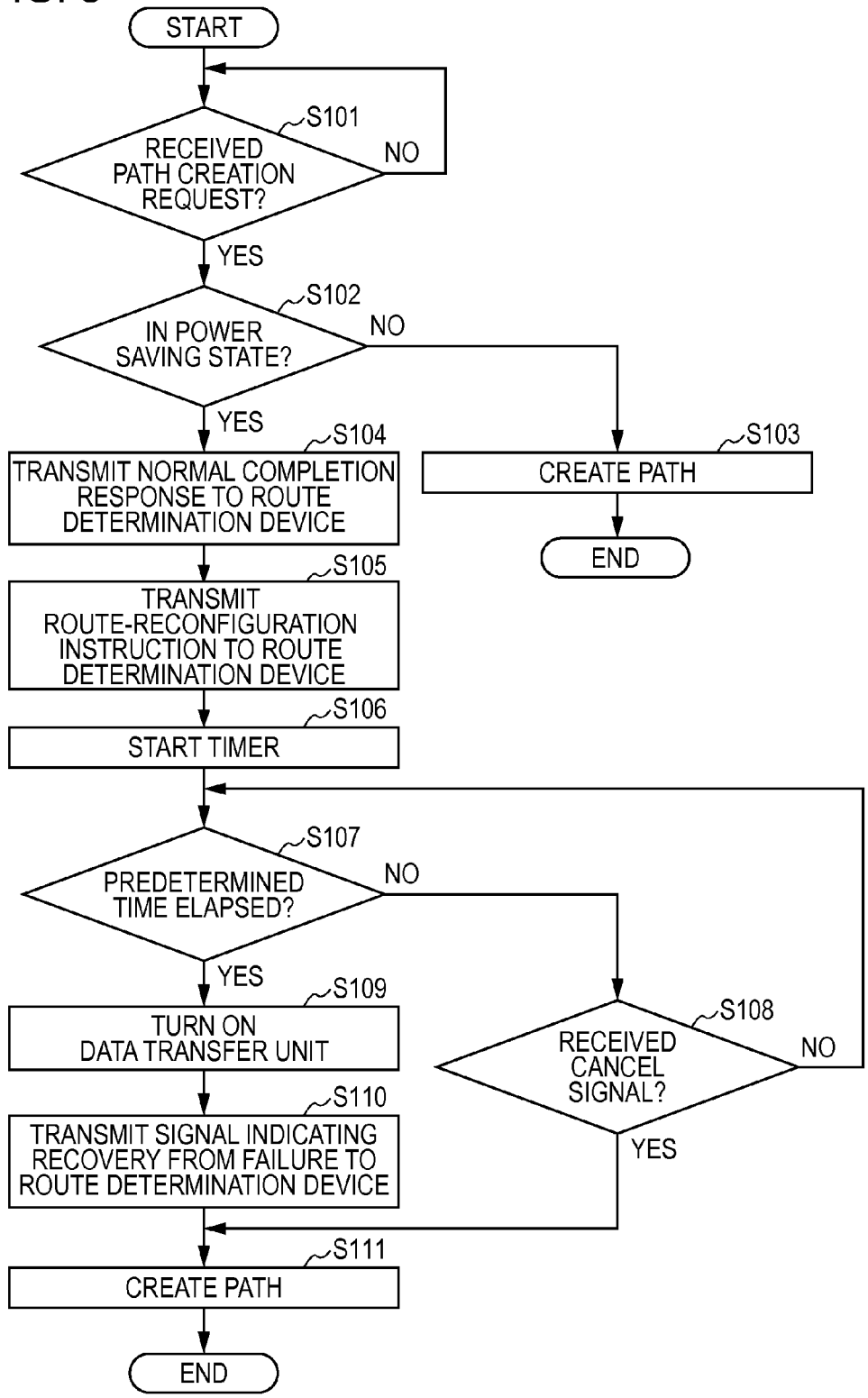
FIG. 5 is a diagram illustrating an example of an operational flowchart of a network device, according to a first embodiment.

FIG. 5 is a diagram illustrating an example of an operational flowchart of a network device, according to a first embodiment.

In operation S101, the controller 13 determines whether or not the controller 13 has received a path creation request.

When the controller 13 determines that the controller 13 has received the path creation request (YES in operation S101), the controller 13 determines whether or not the network device 10 is in a power saving state, in operation S102.

When it is determined that the network device 10 is not in a power saving state, that is, the data transfer unit 11 of the network device 10 is in an on state (NO in operation S102), the controller 13 creates a path, between the network device 10 and the subsequent network device along the transmission route, requested by the path creation request, in operation S103.

When it is determined that the network device 10 is in a power saving state (YES in operation S102), the controller 13 transmits a normal completion response to the route determination device, in operation S104.

In operation S105, the controller 13 transmits a route-reconfiguration instruction to the route determination device. Note that the path creation request contains identification information identifying the route determination device that is an originator (requestor) of the path creation. The identification information (requestor device ID) identifying the originator of the path creation request may be managed, in a management table, in association with a port corresponding to a transmission route indicated by the path creation request.

FIG. 6 is a diagram illustrating an example of a management table, according to an embodiment. In FIG. 6, a port of the network device 10, a state of the port, and a device as an originator of a path creation request (a requestor device) are associated with each other. In this case, since it is determined that the network device 10 is in a power saving state, the state of the port corresponding to the transmission route indicated by the path creation request received in operation S101 is managed as the power saving state in the management table.

In operation S106, the controller 13 starts a timer at a timing of transmitting a route-reconfiguration instruction. In this case, in the management table, the state of the port corresponding to the transmission route indicated by the path creation request is changed to a waiting-for-determination state, as depicted in FIG. 6.

In operations S107 and S108, the controller 13 determines whether or not the controller 13 has received a cancel signal within a predetermined time. This determination operation is repeated until the predetermined time has elapsed or the cancel signal is received (NO in operation S107 and NO in operation S108).

When the predetermined time has elapsed without receiving the cancel signal (YES in operation S107), the controller 13 causes the power supply unit 12 to start power supply to the data transfer unit 11, that is, causes the power supply unit 12 to turn on the data transfer unit 11, in operation S109.

In operation S110, the controller 13 transmits a signal indicating recovery from the failure to the route determination device.

In operation S111, the controller 13 create a path requested by the path creation request.

When the cancel signal is received before the predetermined time has elapsed (YES in operation S108), the controller 13 creates a path requested by the path creation request (in operation S111). Then, in the management table, the state of the port corresponding to the transmission route indicated by the path creation request is changed to a power saving state.

Note that when the path creation request indicating a transmission route corresponding to a port in a waiting-for-determination state is received, the controller 13 transmits, to the route determination device, a "path-creation failure response" indicating that the creation of a path has failed.

Next, an operational sequence of a network will be described with reference to an example. In the following description, a case where the network has the configuration of FIG. 4 is given as an example.

A network device #A which has received, from the network monitoring control device, a path creation request for creating a path between the network device #A and the network device #D determines an optimal route between the network device #A and the network device #D, based on the network topology held in the network device #A. That is, in this case, the network device #A functions as a route determination device. Then, the network device #A transmits a path creation request to network devices on the determined transmission route. In this case, a route #A→#B→#C→#D is selected as a transmission route. In this case, a segment between the network device #C and the network device #D is a power-saving segment.

The network device #C and the network device #D each give a normal completion response to the network device #A.

Then, immediately after giving the normal completion response, the network device #C and the network device #D each transmit, as a route-reconfiguration instruction, a signal indicating a failure occurrence in a segment between the network devices #C and #D, to the network device #A. The network device #C and the network device #D each start an internal timer. At this time, the network devices #C and #D each change the state of the corresponding port in the management table to a waiting-for-determination state.

When receiving the signal indicating the failure occurrence, that is, the route-reconfiguration instruction, the network device #A obtains another route other than the route #A→#B→#C→#D. Then, when a new route between the network device #A and the network device #D is obtained, the network device #A transmits a path creation request to network devices on the new route. In this case, assume that a route from #A→#B→#F→#D is obtained as the new route.

When receiving the path creation request, the network devices #B, #F, and #D along the new route each execute path creation processing and give the normal completion response to the network device #A. Then, when receiving the normal completion response from all of the network devices along the new route, the network device #A transmits a cancel signal to the network devices #B, #C, and #D along the old route. When receiving the cancel signal, the network devices #C and #D each change the state of the corresponding port in the management table to a power saving state, and transmits a signal indicating recovery from the failure to the network device #A.

On the other hand, when a new route is not obtained, the network device #A does not perform any processing operation. As described above, the network devices #C and #D each start the internal timer at the timing when the signal indicating the failure occurrence (the route-reconfiguration instruction) was transmitted to the network device #A. When the predetermined time has elapsed without receiving a cancel signal, the network devices #C and #D each start power supply to the data transfer unit 11 in the power saving state, transmit a signal indicating recovery from the failure to the route determination device #A, and create a path requested by the path creation request.

As described above, according to this embodiment, in the network device 10, when a certain condition is satisfied, the controller 13 transmits a signal instructing reconfiguration of the transmission route set by the route determination device, to the route determination device via the control link. The certain condition is that a path creation request for creating a path corresponding to the transmission route which has been set is received from the route determination device via the control link, in a power saving state in which power supply to the data transfer unit 11 is stopped.

Thus, the network device 10 may continue the power saving state. In addition, the route determination device may select, in response to instruction of reconfiguring the transmission route, a route which is not in a power saving state, as a new transmission route.

Second Embodiment

A second embodiment is related to a specific example of a circuit configuration.

Figure 7:
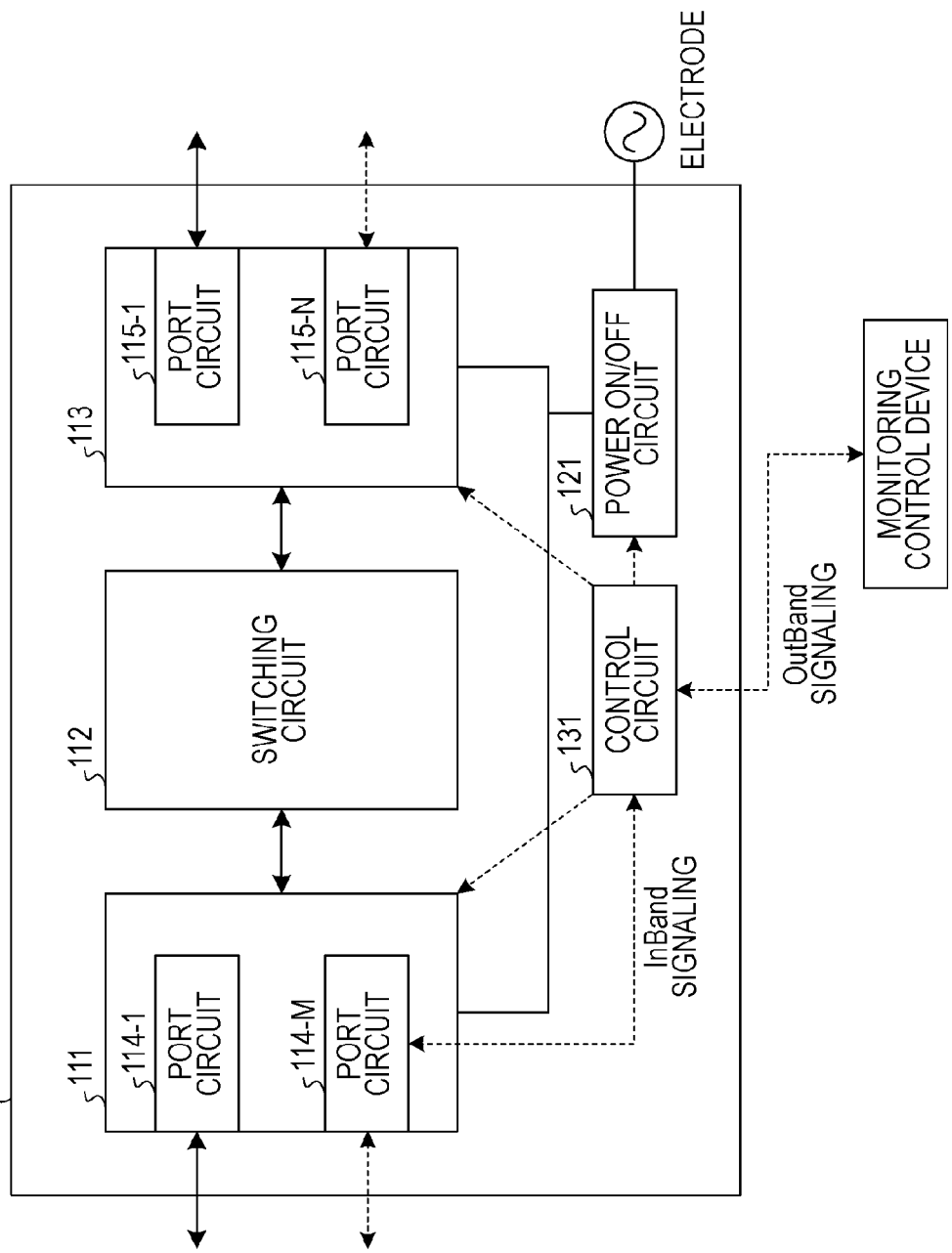
FIG. 7 is a diagram illustrating an example of a circuit configuration of a network device, according to a second embodiment.

FIG. 7 is a diagram illustrating an example of a circuit configuration of a network device, according to a second embodiment. A network device 100 illustrated in FIG. 7 corresponds to the network device 10.

Interface circuits 111 and 113 and the switching circuit 112 correspond to the data transfer unit 11. The interface circuit 111 includes port circuits 114-1 to 114-M. The interface circuit 113 includes port circuits 115-1 to 115-N. The network device 100 is connected to another network device adjacent thereto or a monitoring control device via one of the port circuits 114-1 to 114-M and the port circuits 115-1 to 115-N. Inband signaling is performed via the interface circuits 111 and 113. Accordingly, in the case where inband signaling is used as a control link, even in a power saving state, among the port circuits 114-1 to 114-M of the interface circuit 111 and the port circuits 115-1 to 115-N of the interface circuit 113, only port circuits which correspond to a data link are turned off, and port circuits which correspond to a control link are turned on.

The switching circuit 112 performs data transfer between the interface circuit 111 and the interface circuit 113.

A power on/off circuit 121 corresponds to the power supply unit 12. A control circuit 131 corresponds to the controller 13.

Third Embodiment

A third embodiment realizes various kinds of processing described in the first embodiment by causing a computer to execute programs prepared in advance.

Figure 8:
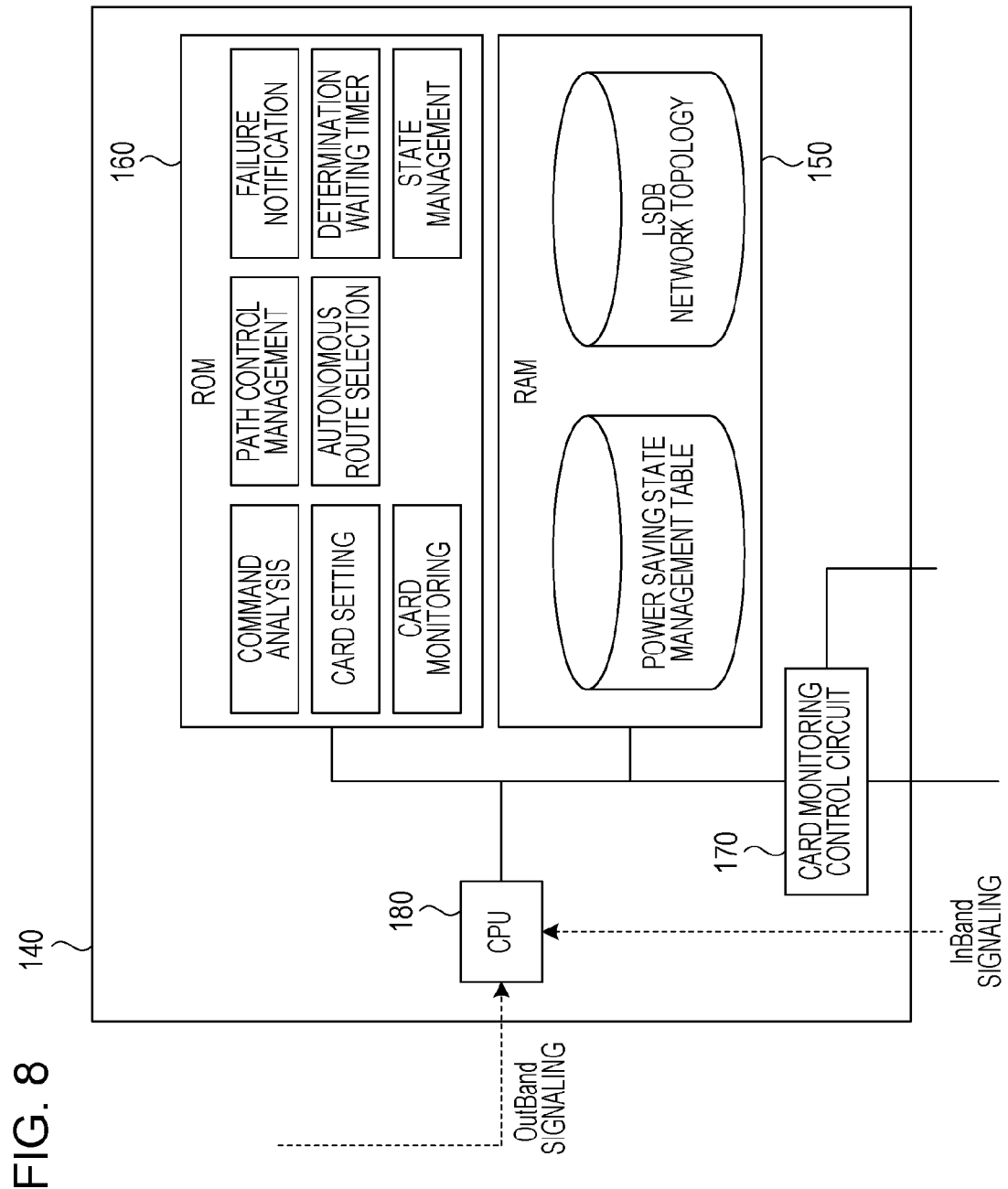
FIG. 8 is a diagram illustrating an example of a control device that executes a network control program, according to a third embodiment.

FIG. 8 is a diagram illustrating an example of a control device that executes a network control program, according to a third embodiment. In FIG. 8, a control device 140 executes a network control program, and is configured to include a RAM 150, a ROM 160, a card monitoring control device 170, and a CPU 180. A network control program is stored beforehand in the ROM 160. The network control program includes a command analysis program, a card setting program, a card monitoring program, a bus control management program, an autonomous route selection program, a failure notification program, a waiting-for-determination timer program, and a state management program. The CPU 180 reads out each program and executes a process corresponding to the read-out program. Content used for each processing operation under network control is stored in the RAM 150. Moreover, a power saving state management table, a link state data base (LSDB), and a network topology are also stored in the RAM 150.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus to transfer a data signal by bypassing a power-saving segment in a communication network, the apparatus comprising:
    a data transmission unit configured to:
        receive the data signal from an upstream node adjacent to the apparatus in an upstream direction of the data signal along a transmission route that is set by a route determination device, and
        transfer the data signal to a downstream node adjacent to the apparatus in a downstream direction of the data signal along the transmission route; and
    a controller configured to:
        transmit, upon receiving a path-creation request to create a path on the transmission route when power supply to the data transmission unit is stopped, a route-reconfiguration instruction to the route determination device for reconfiguration of the transmission route, and
    control power supply to the data transmission unit based on whether a response to the route-reconfiguration instruction is received from the route determination device.

2. The apparatus of claim 1, wherein
    the data transmission unit receives and transfers the data signal via a data link that is set along the transmission route; and
    the controller receives the path-creation request via a control link that is set for transmission of a control signal between the apparatus and the route determination device; and
    transmits the route-reconfiguration instruction via the control link.

3. The apparatus of claim 1, wherein
    the controller transmits, to the route determination device, a completion response in response to the path-creation request, before transmitting the route-reconfiguration instruction.

4. The apparatus of claim 1, wherein
    the route-reconfiguration instruction is a signal indicating that a failure has occurred in between the apparatus and the downstream node.

5. The apparatus of claim 4, wherein
    when the controller receives, from the route determination device, a path-cancel signal for requesting the route determination device to cancel the path requested by the path-creation request, before a predetermined time elapses from transmission of the route-reconfiguration instruction, the controller transmits a signal indicating that the failure has recovered to the route determination device.

6. The apparatus of claim 4, wherein
    when the controller fails to receive, from the route determination device, a path-cancel signal for cancelling the path-creation request, before a predetermined time elapses from transmission of the route-reconfiguration instruction, the controller resumes the power supply to the data transmission unit, creates the path requested by the path-creation request, and transmits a signal indicating that the failure has recovered to the route determination device.

7. The apparatus of claim 1, wherein the controller controls power supply to the data transmission unit based on whether a response to the route-reconfiguration instruction is received from the route determination device within a predetermined period from the controller transmitting the route-reconfiguration instruction.

8. A method for transferring a data signal by bypassing a power-saving segment in a communication network, the method being performed by an apparatus including a data transfer unit and a controller, the method comprising:
    upon receiving, when power is supplied to the data transmission unit, the data signal from an upstream node adjacent to the apparatus in an upstream direction of the data signal along a transmission route that is set by a route determination device, transferring, by the data transfer unit, the data signal to a downstream node adjacent to the apparatus in a downstream direction of the data signal along the transmission route;

upon receiving a path-creation request to create a path on the transmission route, when power supply to the data transmission unit is stopped, transmitting, by the controller, a route-reconfiguration instruction to the route determination device for reconfiguration of the transmission route; and controlling power supply to the data transmission unit based on whether a response to the route-reconfiguration instruction is received from the route determination device by the controller.

9. A non-transitory computer readable recording medium having stored therein a program for causing a computer included in an apparatus to execute a procedure, the apparatus including a data transfer unit and a controller, the procedure comprising:

upon receiving, when power is supplied to the data transmission unit, the data signal from an upstream node adjacent to the apparatus in an upstream direction of the data signal along a transmission route that is set by a route determination device, transferring, by the data transfer unit, the data signal to a downstream node adjacent to the apparatus in a downstream direction of the data signal along the transmission route; and upon receiving a path-creation request to create a path on the transmission route, when power supply to the data transmission unit is stopped, transmitting, by the controller, a route-reconfiguration instruction to the route determination device for reconfiguration of the transmission route; and controlling power supply to the data transmission unit based on whether a response to the route-reconfiguration instruction is received from the route determination device by the controller.

\* \* \* \* \*